United States Patent
Lee et al.

(10) Patent No.: US 8,202,931 B2
(45) Date of Patent: Jun. 19, 2012

(54) ORGANIC POLYSILOXANE, ADHESIVE COMPOSITION COMPRISING THE SAME, AND RUBBER STIFFENER TREATED THEREBY

(75) Inventors: Jae-Woong Lee, Daegu (KR); Young-Se Oh, Busan (KR); Gi-Woong Kim, Daegu (KR)

(73) Assignee: Kolon Industries, Inc., Kyungki-Do (KR)

( * ) Notice: Subject to any disclaimer, the term of this patent is extended or adjusted under 35 U.S.C. 154(b) by 270 days.

(21) Appl. No.: 12/530,448

(22) PCT Filed: Mar. 6, 2008

(86) PCT No.: PCT/KR2008/001284
§ 371 (c)(1),
(2), (4) Date: Sep. 8, 2009

(87) PCT Pub. No.: WO2008/111761
PCT Pub. Date: Sep. 18, 2008

(65) Prior Publication Data
US 2010/0092777 A1    Apr. 15, 2010

(30) Foreign Application Priority Data

Mar. 9, 2007  (KR) .................. 10-2007-0023558
Mar. 6, 2008  (KR) .................. 10-2008-0020926

(51) Int. Cl.
*C08G 77/04* (2006.01)

(52) U.S. Cl. ........ 524/541; 524/588; 524/837; 524/841; 525/476; 528/29; 428/447

(58) Field of Classification Search .................. 524/541, 524/588, 837, 841; 528/29; 525/476
See application file for complete search history.

(56) References Cited

U.S. PATENT DOCUMENTS

| | | | |
|---|---|---|---|
| 3,234,067 A | | 2/1966 | Krysiak |
| 5,334,653 A | * | 8/1994 | Kennoki et al. ............... 524/714 |
| 5,618,860 A | | 4/1997 | Mowrer et al. |
| 5,650,474 A | | 7/1997 | Yamaya et al. |
| 6,159,405 A | * | 12/2000 | Taylor ........................ 264/177.2 |
| 6,565,976 B1 | * | 5/2003 | Qureshi et al. ................ 428/413 |
| 2002/0156187 A1 | | 10/2002 | Greene et al. |

FOREIGN PATENT DOCUMENTS

| | | |
|---|---|---|
| JP | 46-11251 | 3/1971 |
| JP | 46-11251 A | 3/1971 |
| WO | 2006/112943 A1 | 10/2006 |

OTHER PUBLICATIONS

Machine generated English language translation JP 08-333,440, Dec. 1996.*

* cited by examiner

*Primary Examiner* — Margaret Moore
(74) *Attorney, Agent, or Firm* — Sughrue Mion, PLLC

(57) ABSTRACT

The present invention relates to a novel polymer, an adhesive composition including the same, and a rubber reinforcing material treated with the same, and more particularly to an organic polysiloxane including a certain repeating unit, an adhesive composition including the same, and a rubber reinforcing material treated with the same.

Because the organic polysiloxane and the adhesive composition including the same is superior in reactivity to a hydroxyl group, an amide group, or an amine group, and has high thermal resistance and low stiffness, the composition is preferably used for surface-treating a rubber reinforcing material such as a tire cord and make it possible to provide a rubber reinforcing material such as a tire cord having good properties.

11 Claims, 4 Drawing Sheets

ORGANIC POLYSILOXANE, ADHESIVE COMPOSITION COMPRISING THE SAME, AND RUBBER STIFFENER TREATED THEREBY

CROSS REFERENCE TO RELATED APPLICATION

This application is a National Stage of International Application No. PCT/KR2008/001284 filed Mar. 6, 2008, claiming priority based on Korean Patent Application Nos. 10-2007-0023558 filed Mar. 9, 2007 and 10-2008-0020926 filed Mar. 6, 2008, the contents of all of which are incorporated herein by reference in their entirety.

BACKGROUND OF THE INVENTION (a) Field of the Invention

The present invention relates to a novel polymer, an adhesive composition including the same, and a rubber reinforcing material treated with the same, and more particularly to an organic polysiloxane including a certain repeating unit, a method of preparing the same, an adhesive composition including the same, and a rubber reinforcing material treated with the same.

(b) Description of the Related Art

Recently, most of tire cords include a raw cord consisting of a polyester fiber such as a polyethyleneterephthalate (hereinafter 'PET') fiber, a polyamide fiber, an aramide fiber, or a cellulose-based fiber, and they are coated with a resorcinol-formaldehyde-latex (hereinafter 'RFL') resin (an adhesive) in order to increase the adhesive strength between the raw cord and the rubber of the tire.

However, because it is difficult to give the sufficient adhesive strength to the raw cord with the RFL resin alone, many methods of providing another adhesive between the raw cord and the RFL resin are being used.

As a method of using a para-chlorophenol RF resin (PEXUL), a method of treating a raw cord with a first treating solution including water, resorcinol, formaldehyde, a rubber latex, and the para-chlorophenol RF resin (PEXUL), and further treating the raw cord with a second treating solution including a RFL resin (a composition of resorcinol-formaldehyde-latex) was known.

However, when the raw cord is treated by such method, the raw cord becomes to include a respectable amount of aqueous ammonia that is used as a main solvent for the para-chlorophenol RF resin (PEXUL), and an extra purifier is required to treat ammonia because ammonia is classified as a hazardous material. In addition to, it may cause the pollution of the workshop on the scene of labor and its peculiar smell may decrease the workability.

Furthermore, there are disadvantages in that the rate of inferiority increases, the specific weight of the dipped cord also increases, and it imposes finally a heavy burden of the cost on the manufacturer, because of tiny gels, those are a kind of the dust generated by the resorcinol, the formaldehyde, and the para-chlorophenol RF resin (PEXUL) after treating by the method.

To improve the problems, a method of treating a raw cord with an adhesive including an epoxy and a diisocyanate compound as its main substances is generally used. In such method, the raw cord is treated with a first treating solution consisting of a mixture of a diisocyanate blocked with a caprolactam or a phenol and an epoxy compound, and then the cord is further treated with a second treating solution including the RFL resin.

In such method, however, the stiffness of the heat-treated and dipped tire cord increases considerably, because the first treating composition includes the highly indurative epoxy compound and the diisocyanate. On account of this, there are problems in that the tip rise ('curl up' is another name) occurs in the process of preparing the tire by using the tire cord, and the rate of inferiority of the tire increases.

On this account, a softener is also used in the heat-treating process in order to lower the stiffness of the tire cord, but the curl up still occurs at the tire cord itself treated with the softener if the softener is excessively used.

Meanwhile, U.S. Pat. No. 3,234,067 discloses a method of treating a polyester raw cord with a first treating solution including a mixed solution of a diisocyanate blocked with a caprolactam or a phenol and an epoxy compound, and further treating the cord with a second treating solution consisting of an initial condensate of a resorcinol and a formaldehyde, and a rubber latex. When the cord is treated by such method, however, the dispersion stability of the diisocyanate is poor, and the blocking compound such as the phenol or the caprolactam is also generated after heat-treating the raw cord coated with the first treating solution, and the compound may harmfully affect the environment. Furthermore, the coated adhesive layer may be rigid and there are problems of that the stiffness of the cord may excessively increase and its flexibility may deteriorate, because the epoxy compound and the diisocyanate are used together in the first treating solution. In addition to, the adhesive layer including many carbon-carbon bonds of the hydrocarbons is coated on the surface of the cord treated by the method, and thus the thermal resistance, the chemical resistance, or the oxidation resistance is not sufficient, because the binding energy of the carbon-carbon bond is 83 kcal/mol and it is not sufficiently high.

Furthermore, in Japan patent publication Sho 46-11251, a mixture prepared by mixing a halogenated phenol (PEXUL), such as 2,6-bis(2',4'-dihidroxyphenylmethyl)-4-chlorophenyl, and a reaction product of recorcinol-formaldehyde with a RFL resin solution consisting of an initial condensate of the resorcinol and the formaldehyde is disclosed as a representative treating solution for a polyester raw cord. When the cord is treated by the treating solution including such ingredients, however, the adhered amount of the treating solution to the raw cord must be heavily much in order to obtain the sufficient adhesive strength (drawing strength), and thus the dipped cord treated with the treating solution is hard to reinforce a rubber product such as a tire because its stiffness increases excessively.

SUMMARY OF THE INVENTION

It is an aspect of the present invention to provide a novel polymer and a method of preparing the same, wherein the polymer can be included in an adhesive composition for a rubber reinforcing material and the like, and the polymer can decrease a stiffness of the reinforcing material treated with the adhesive composition and also improve several properties such as the thermal resistance and the like while improving its flexibility.

It is another aspect of the present invention to provide an adhesive composition including the novel polymer.

Still another aspect of the present invention is to provide a rubber reinforcing material surface-treated with the adhesive composition.

Hence, the present invention provides an organic polysiloxane including the repeating unit represented by the following Chemical Formula 1:

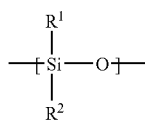

[Chemical Formula 1]

wherein,
R¹ is a functional group having an epoxy end group, and
R² is a functional group selected from the group consisting of a functional group having an epoxy end group, hydrogen, hydroxy, a C1-C6 alkyl, a C3-C8 cycloalkyl, a C6-C10 aryl, and a siloxane.

The present invention also provides a method of preparing the organic polysiloxane of Claim 1 including a step of hydrolyzing and polycondensating the siloxane monomer represented by the following Chemical Formula 4:

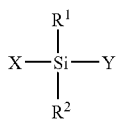

[Chemical Formula 4]

wherein,
R¹ is a functional group having an epoxy end group,
R² is a functional group selected from the group consisting of a functional group having an epoxy end group, hydrogen, hydroxy, a C1-C6 alkyl, a C3-C8 cycloalkyl, a C6-C10 aryl, and a siloxane, and
X and Y are independently hydroxy, a halogen, a C1-C4 alkoxy, or a siloxane.

The present invention also provides an adhesive composition including the organic polysiloxane.

The present invention also provides a rubber reinforcing material surface-treated with the adhesive composition.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE EMBODIMENTS

Figure 1:
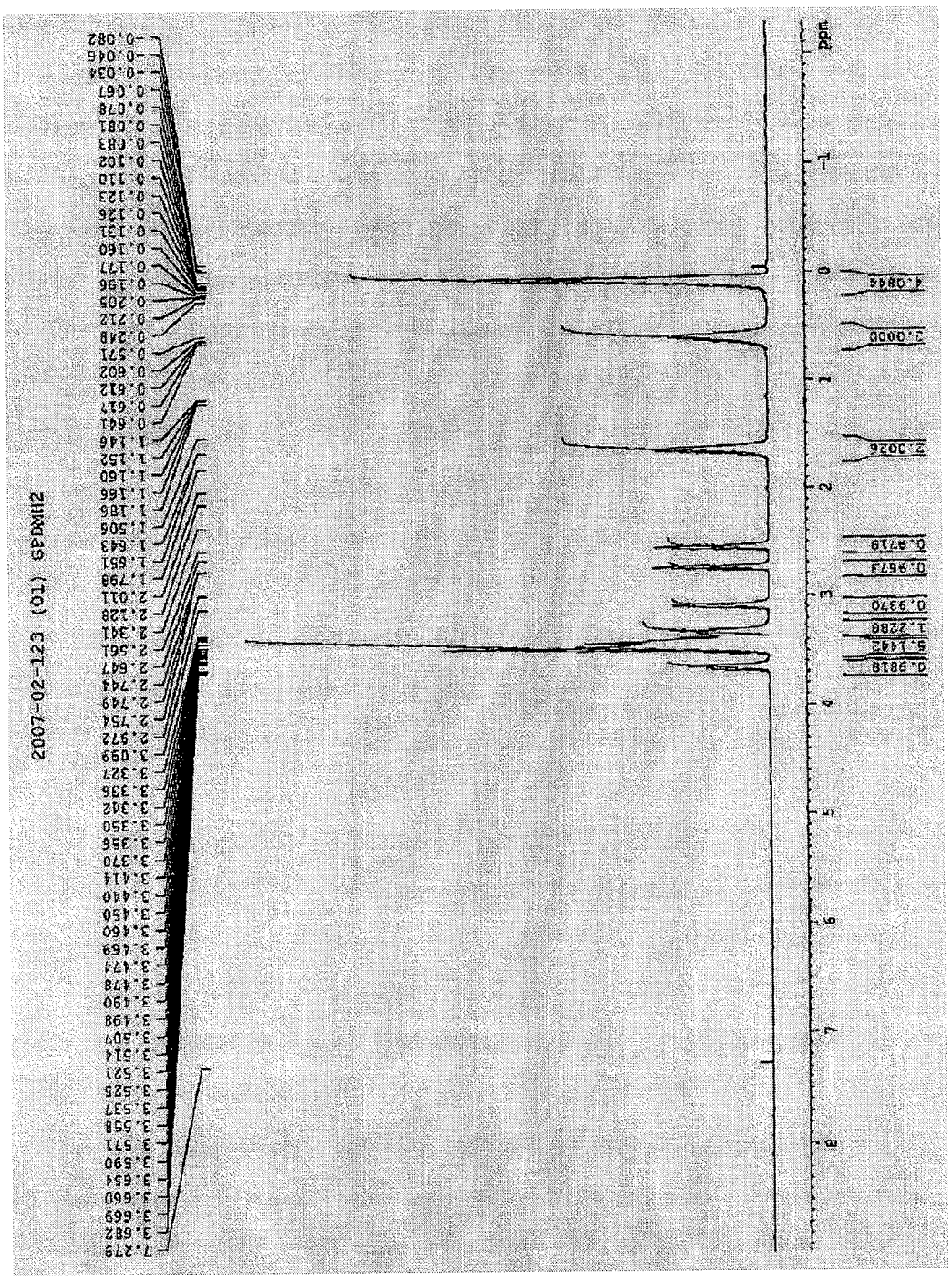
FIG. 1 is a drawing representing the NMR spectrum of the organic polysiloxane according to Preparing Example 1.

Hereinafter, the present invention is explained in more detail.
The present inventors found the fact that an adhesive composition that is good in bonding property to a fiber or a film, especially to a polymer itself constituting the fiber or the film used as a rubber reinforcing material, not stiff, and superior in thermal resistance can be prepared by using the organic polysiloxane including the repeating unit represented by the following Chemical Formula 1, and accomplished the present invention:

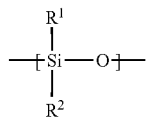

[Chemical Formula 1]

wherein,
R¹ is a functional group having an epoxy end group, and
R² is a functional group selected from the group consisting of a functional group having an epoxy end group, hydrogen, hydroxy, a C1-C6 alkyl, a C3-C8 cycloalkyl, a C6-C10 aryl, and a siloxane.

More particularly, because the organic polysiloxane of the present invention includes a substituent(s) having an epoxy end group, it maintains a stable state in the adhesive composition at room temperature, and shows good reactivity (or bonding property) to the hydroxyl end groups of a polyester, the amide groups of a polyamide, and the hydroxyl groups of cellulose-based polymer at a high temperature.

Furthermore, —Si—O— bond constituting the main chain of the organic polysiloxane has the binding energy of 108 kcal/mol and is superior in thermal stability to C—C bond (83 kcal/mol), and because of the nature of the intrinsic properties of silicone, it also shows low stiffness, good flexibility, and excellent chemical resistance and oxidation resistance.

Therefore, it is possible to provide an adhesive composition that is superior in bonding property to a fiber or a film, especially to a polymer itself constituting the fiber or the film used as a rubber reinforcing material such as a tire cord, not stiff rather flexible, and also good in several properties such as thermal resistance, chemical resistance, oxidation resistance, and the like, by using the organic polysiloxane that is the novel polymer of the present invention.

The organic polysiloxane of the present invention may have the weight average molecular weight (Mw) of 100 to 10000. With this, the adhesive composition including the same may show a low level of stiffness and good flexibility, while showing excellent thermal resistance, chemical resistance, and oxidation resistance as well as good bonding property (adhesive strength) to a rubber reinforcing material, a fiber, a film, and the like.

In the organic polysiloxane of the present invention, the kind of the functional group having the epoxy end group included in the repeating unit is not particularly limited, however it may be an epoxy, a C3-C8 epoxy alkyl, a C8-C13 epoxy alkyl aryl, a C8-C13 epoxy aryl alkyl, a C4-C9 epoxy cycloalkyl, a C4-C9 alkyl glycidyl ether, a C9 or more aryl glycidyl ether, a C3-C8 glycidoxy alkyl, or a C9 or more glycidoxy aryl. In addition to, many functional groups having various kinds of epoxy end groups can be substituted in the repeating unit, and it is possible to make the adhesive composition including the organic polysiloxane show good adhesive strength to a polyester, a polyamide, or a cellulose-based polymer constituting various fibers or films, inclusive of a rubber reinforcing material such as a tire cord.

Most preferably the repeating unit represented by the following Chemical Formula 1 may be the unit represented by the following Chemical Formula 2. With this, the process of preparing the organic polysiloxane and the adhesive composition including the same, the cost, and the convenience of using it may be optimized:

[Chemical Formula 2]

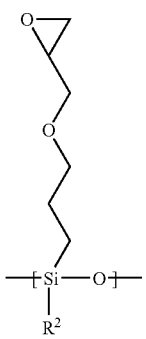

wherein,

R² is a functional group selected from the group consisting of a functional group having an epoxy end group, hydrogen, hydroxy, a C1-C6 alkyl, a C3-C8 cycloalkyl, a C6-C10 aryl, and a siloxane.

Though explained in detail below, it is needed to dissolve or emulsify the organic polysiloxane in water or an aqueous solvent, for example, methanol, an aqueous methanol solution, ethanol, or an aqueous ethanol solution, in order to use it as an adhesive, and it s preferable that the organic polysiloxane is a linear polymer in order to improve the solubility or the emulsifying property in water or the aqueous solution.

Meanwhile, the organic polysiloxane may be a polymer consisting of the repeating unit represented by Chemical Formula 1 only, or a copolymer further including the repeating unit represented by the following Chemical Formula 3 with necessity:

[Chemical Formula 3]

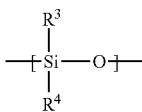

wherein,

R³ and R⁴ are independently a functional group selected from the group consisting of hydrogen, hydroxy, a C1-C6 alkyl, a C3-C8 cycloalkyl, a C6-C10 aryl, and a siloxane.

At this time, the organic polysiloxane is preferably a copolymer including the repeating units represented by Chemical Formulae 2 and 3 in the molar ratio of 1.0:0.1 to 1.0:1.0, considering the adhesive strength of the adhesive composition including the organic polysiloxane and the stiffness.

Furthermore, the organic polysiloxane may be a copolymer further including a repeating unit substituted with a functional group having a thiol end group, in addition to the repeating units of Chemical Formulae 2 and 3.

Though explained in detail below, the adhesive composition including the organic polysiloxane may be used for treating a rubber reinforcing material such as a tire cord and the like including a polyester, a polyamide, or a cellulose-based polymer. At this time, though the adhesive composition including the organic polysiloxane shows good adhesive strength to the polyester, the polyamide, or the cellulose-based constituting the rubber reinforcing material, it does not have good adhesive strength to rubber products such as a tire and the like to which the rubber reinforcing material is applied, and thus it is generally needed to treat the rubber reinforcing material further with a RFL (resorcinol-formaldehyde-latex) resin (an adhesive) and the like having good adhesive strength to the rubber products, after treating the rubber reinforcing material with the adhesive composition. However, if the organic polysiloxane further includes the repeating unit substituted with the functional group having the thiol end group, the adhesive composition including the organic polysiloxane can also have good adhesive strength to the rubber products owing to the thiol functional group. Therefore, the further process treating the rubber reinforcing material with the RFL resin can be omitted and the adhesive composition including the organic polysiloxane can have good adhesive strength to the rubber products too.

Meanwhile, the organic polysiloxane of the present invention can be prepared by a method including a step of hydrolyzing and polycondensating the siloxane monomer represented by the following Chemical Formula 4:

[Chemical Formula 4]

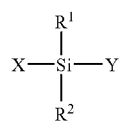

wherein,

R¹ is a functional group having an epoxy end group,

R² is a functional group selected from the group consisting of a functional group having an epoxy end group, hydrogen, hydroxy, a C1-C6 alkyl, a C3-C8 cycloalkyl, a C6-C10 aryl, and a siloxane, and X and Y are independently hydroxy, a halogen, a C1-C4 alkoxy, or a siloxane.

At this time, the reaction condition for the hydrolysis and the polycondensation follows the conventional reaction condition for the hydrolysis and the polycondensation, and the organic polysiloxane of the present invention, for example, may be prepared by hydrolyzing and polycondensating the siloxane monomer in an aqueous hydrochloric acid solution.

Also, when the organic polysiloxane of the present invention is a copolymer including both repeating units of Chemical Formulae 2 and 3, the organic polysiloxane can be prepared by hydrolyzing and copolycondensating the monomer of Chemical Formula 4 and the monomer represented by the following Chemical Formula 5 together, and the reaction condition of the preparing method also follows the conventional reaction condition for the hydrolysis and the polycondensation of alkoxysilanes:

[Chemical Formula 5]

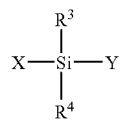

wherein,

R³ and R⁴ are independently a functional group selected from the group consisting of hydrogen, hydroxy, a C1-C6 alkyl, a C3-C8 cycloalkyl, a C6-C10 aryl, and a siloxane, and X and Y are independently hydroxy, a halogen, a C1-C4 alkoxy, or a siloxane.

Furthermore, when the organic polysiloxane of the present invention is a copolymer including the repeating unit substituted with the functional group having the thiol end group along with the repeating units of Chemical Formulae 2 and 3, the organic polysiloxane can be prepared by hydrolyzing and copolycondensating the monomers corresponding to the repeating units.

As disclosed above, the organic polysiloxane of the present invention can be applied to every kinds of products those can react with an epoxy group as an adhesive, and it can be included preferably in an adhesive composition for a fiber or a film as its chief ingredient, and more preferably in an adhesive composition for a rubber reinforcing material such as a tire cord, a fiber, or a film including at least one polymer selected from the group consisting of a polyester, a polyamide, and a cellulose-based polymer.

The adhesive composition including the organic polysiloxane has good adhesive strength and durability because the epoxy groups on the side chain thereof is chemically bonded to the polyester, the polyamide, the cellulose-based polymer, and the like constituting the fiber or the film.

Furthermore, the adhesive composition including the organic polysiloxane shows good thermal stability and thermal resistance because of the high binding energy of a plurality of —Si—O— bonds of the organic polysiloxane, and it also shows low stiffness, good flexibility, and excellent chemical resistance and oxidation resistance because of the nature of the intrinsic properties of silicone.

Therefore, the organic polysiloxane of the present invention can be used very usefully as an adhesive component to adhere a fiber or a film to rubber, and can be preferably used as an adhesive for an industrial fiber such as a tire cord and the like or a rubber reinforcing material such as a belt and the like, and especially, it is very suitable to be used as an adhesive component of a dipping solution for a tire cord.

Hereinafter, the adhesive composition including the organic polysiloxane of the present invention is provided.

Because the adhesive composition includes the present novel polymer, namely the organic polysiloxane, such adhesive composition can show an excellent thermal resistance owing to the high binding energy of —Si—O— bond while showing a good adhesive strength to a rubber reinforcing material, a fiber, or a film including at least one polymer selected from the group consisting of a polyester, a polyamide, and a cellulose-based polymer, and it can also show low stiffness, and good flexibility, chemical resistance, and oxidation resistance because of the nature of the intrinsic properties of silicone. Therefore, such adhesive composition may be preferably applied to various fibers or films, and especially, it may be preferably used as an adhesive component of a dipping solution for a rubber reinforcing material such as a tire cord.

Meanwhile, such adhesive composition may include 1 to 10 parts by weight of the organic polysiloxane per 100 parts by weight of an aqueous solvent. With this, the adhesive composition can show a good adhesive strength to a fiber or a film consisting of a polyester, a polyamide, and a cellulose-based polymer, and can improve the workability of using the adhesive composition.

Furthermore, the adhesive composition may further include a blocked isocyanate-based compound along with the organic polysiloxane, and may preferably further include a diisocyanate blocked with a caprolactam or a phenol. With this, the adhesive strength of the adhesive composition to a fiber or a film may be improved and it is possible to prevent the exfoliation of the adhesive composition treated on the surface of the fiber or the film owing to the cross-linking of the epoxy group of the organic polysiloxane and the isocyanate-based compound.

At this time, it is preferable that the adhesive composition includes the organic polysiloxane and the blocked isocyanate-based compound in the weight ratio of 1.0:0.5 to 1.0:3.5, considering several properties such as the adhesive strength to the fiber or the film, the thermal resistance or the stiffness of the adhesive composition, and the like.

The adhesive composition including the only organic polysiloxane or selectively further including the isocyanate-based compound shows good adhesive strength to a rubber reinforcing material, a fiber, or a film, but it is difficult to show good adhesive strength to a rubber product such as a tire. Therefore, when the adhesive composition is used for adhering a rubber reinforcing material, a fiber, or a film to rubber, for example, applying a tire cord to a tire, it is further needed to treat the fiber or the film with a second treating solution having good adhesive strength to the rubber product, after first treating the fiber or the film with the adhesive composition and drying and heat-treating the same. The representative example of the second treating solution is a conventional compound in which resorcinol, formaldehyde, and a latex are combined, namely a RFL resin (an adhesive).

However, as disclosed above, when the organic polysiloxane is a copolymer further including the repeating unit substituted with the functional group having the thiol end group, the process that treats the fiber or the film with the second treating solution can be omitted, because the organic polysiloxane and the adhesive composition including the same can have good adhesive strength to the rubber product too.

Furthermore, when the adhesive composition further includes a RFL resin along with the organic polysiloxane, the extra process of treating with the second treating solution can be omitted, because the adhesive composition itself have good adhesive strength to the rubber product. Therefore, the adhesive composition may further include a RFL resin, and in this case, it is possible to make the fiber or the film has good adhesive strength to the rubber product by treating of the fiber or the film with only the first adhesive composition and drying and heat-treating the same.

However, the kind of the RFL resin that can be used in the adhesive composition of the present invention is not particularly limited, and the RFL resin, in which resorcinol, formaldehyde, and a latex are combined, hitherto applied to a rubber reinforcing material such as a tire cord and the like can be used without a limitation.

Furthermore, when the adhesive composition includes both of the organic polysiloxane and the RFL resin, the weight ratio of the organic polysiloxane and: the RFL resin may be 1:15 to 1:2. Such weight ratio is determined by considering the adhesive strength to the fiber or the film and to the rubber product to which the fiber and the film is applied.

And, as the most preferable example of the adhesive composition, there is the adhesive composition including 1 to 10 parts by weight of the organic polysiloxane and 10 to 30 parts by weight of the RFL resin per 100 parts by weight of an aqueous solvent.

Furthermore, the adhesive composition may further include an aqueous solution in company with the components such as the organic polysiloxane, the RFL resin, or the isocyanate-based compound, wherein the aqueous solution is for dissolving the components. As the aqueous solution, at least one selected from the group consisting of water, methanol, an aqueous methanol solution, ethanol, and an aqueous ethanol solution, and water can be preferably use. In addition to, however, various aqueous solutions can be also used without a particular limitation.

The adhesive composition of the present invention can be used as an adhesive for every kinds of the products having an end group that can react with an epoxy group, and can be preferably used as an adhesive for a rubber reinforcing material such as a tire cord, a fiber, or a film, and can be most preferably used as an adhesive for a rubber reinforcing material such as a tire cord, a fiber, or a film including at least one selected from the group consisting of a polyester, a polyamide, or a cellulose-based polymer.

Especially, the adhesive composition of the present invention is for treating the surface of a rubber reinforcing material, and is preferable to be used as a dipping solution for an industrial rubber reinforcing material, such as a tire cord, and at this time, it is preferable that the tire cord includes at least one polymer selected from the group consisting of a polyester, a polyamide, or a cellulose-based polymer.

The surface treating of the rubber reinforcing material can be carried out by treating the surface of the rubber reinforcing material such as a tire cord with the adhesive composition of the present invention, and drying and heat-treating the same, and if the adhesive composition does not show a sufficient adhesive strength to the rubber product such as a tire, to which the rubber reinforcing material is applied, it may further include a step of treating the surface of the rubber reinforcing material with a RFL resin, and drying and heat-treating the same.

According to the present invention, the rubber reinforcing material that is surface-treated with the adhesive composition of the present invention is provided. With this, the rubber reinforcing material shows low stiffness and good flexibility. And several properties of the rubber reinforcing material such as thermal resistance, chemical resistance, oxidation resistance, and the like may be good.

Such rubber reinforcing material may be a tire cord surface-treated with the adhesive composition, and the tire cord may include at least one polymer selected from the group consisting of a polyester, a polyamide, or a cellulose-based polymer. The tire cord surface-treated with the adhesive composition can have low stiffness of 9.0 to 20.0 g/3ea (based on 1500 denier) and good flexibility, and its several properties such as thermal resistance, chemical resistance, oxidation resistance, and the like are good.

According to this, the tire cord can show excellent properties and is very suitable to be applied to a tire.

As disclosed above, the organic polysiloxane of the present invention and the adhesive composition including the same has low stiffness and good flexibility, and also is good in several properties such as thermal resistance, chemical resistance, oxidation resistance, and the like.

Therefore, the adhesive composition including the organic polysiloxane may be preferably applied to the surface-treating of a rubber reinforcing material such as a tire cord, a fiber, or a film, and can be used very effectively for adhering the fiber or the film to the rubber product such as a tire.

The rubber reinforcing material such as a tire cord, the fiber, or the film, which is surface-treated with the adhesive composition, may show good thermal resistance, chemical resistance, oxidation resistance, and the like, along with low stiffness and good flexibility.

Hereinafter, the technical features and those effects are presented through preferable examples and comparative examples for understanding the present invention. However, the following examples are only for illustrating the present invention and the present invention is not limited to or by them.

Preparing Example 1

Figure 2:
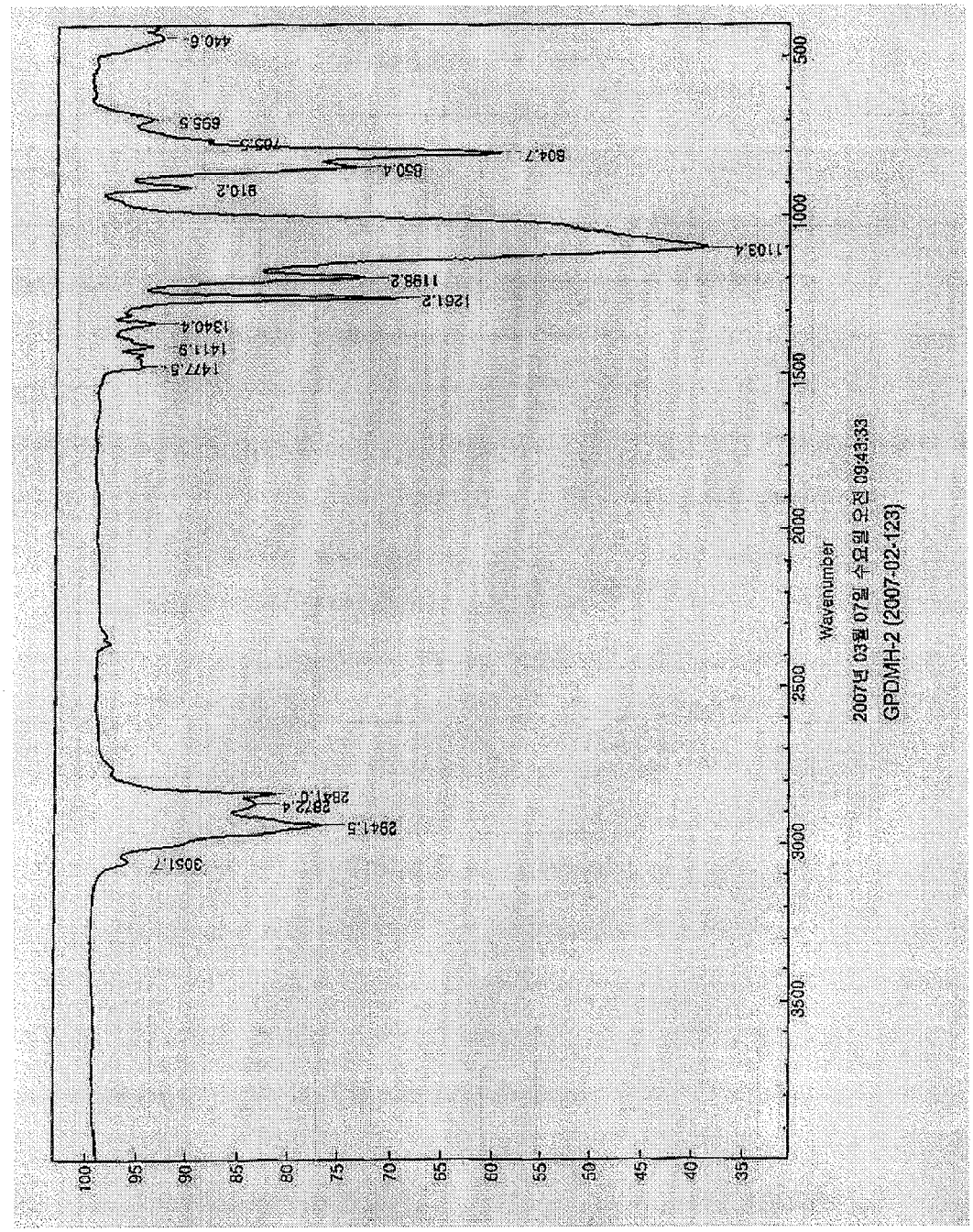
FIG. 2 is a drawing representing the FT-IR spectrum of the organic polysiloxane according to Preparing Example 1.

500 mL of distilled water was introduced into a round 1 L 3-neck flask, and then 10 mL of 0.1M HCl solution was added therein and the solution was stirred at room temperature for 10 minutes. 139.2 mL (0.5 mol) of 3-glycidoxypropyltriethoxy silane and 50.5 mL (0.34 mol) of dimethylethoxy silane were introduced together into the stirred solution and the solution was stirred again with a stirrer at room temperature. The reaction was terminated after stirring for 5 hours, and the remaining HCl was rinsed with excess distilled water. 145 g of the milk-white material obtained therefrom was analyzed by a FT-IR spectrometer and a NMR spectrometer, and the NMR spectrum and the FT-IR spectrum are illustrated in FIG. 1 and FIG. 2.

Preparing Example 2

Figure 3:
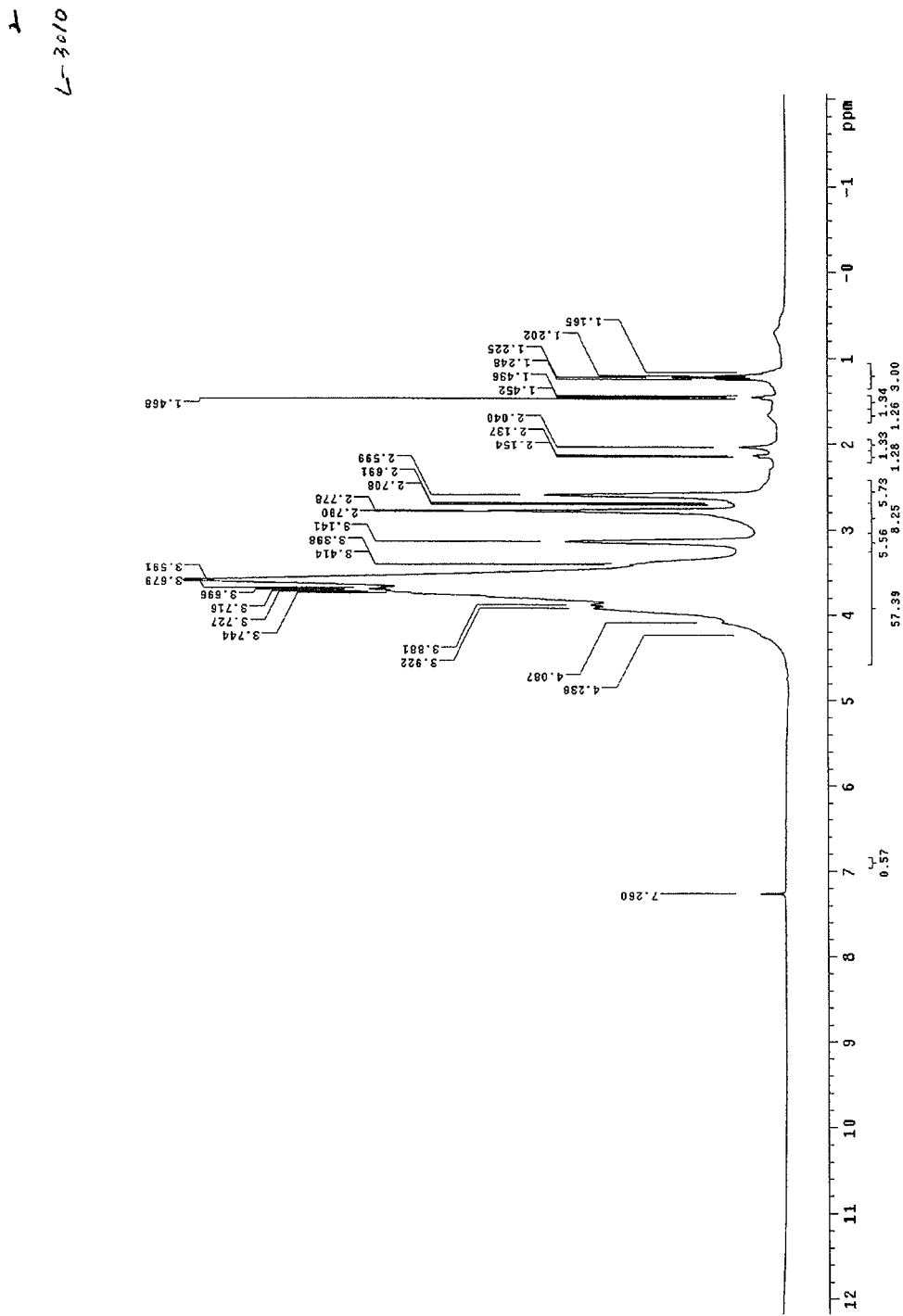
FIG. 3 is a drawing representing the NMR spectrum of the organic polysiloxane according to Preparing Example 2.
Figure 4:
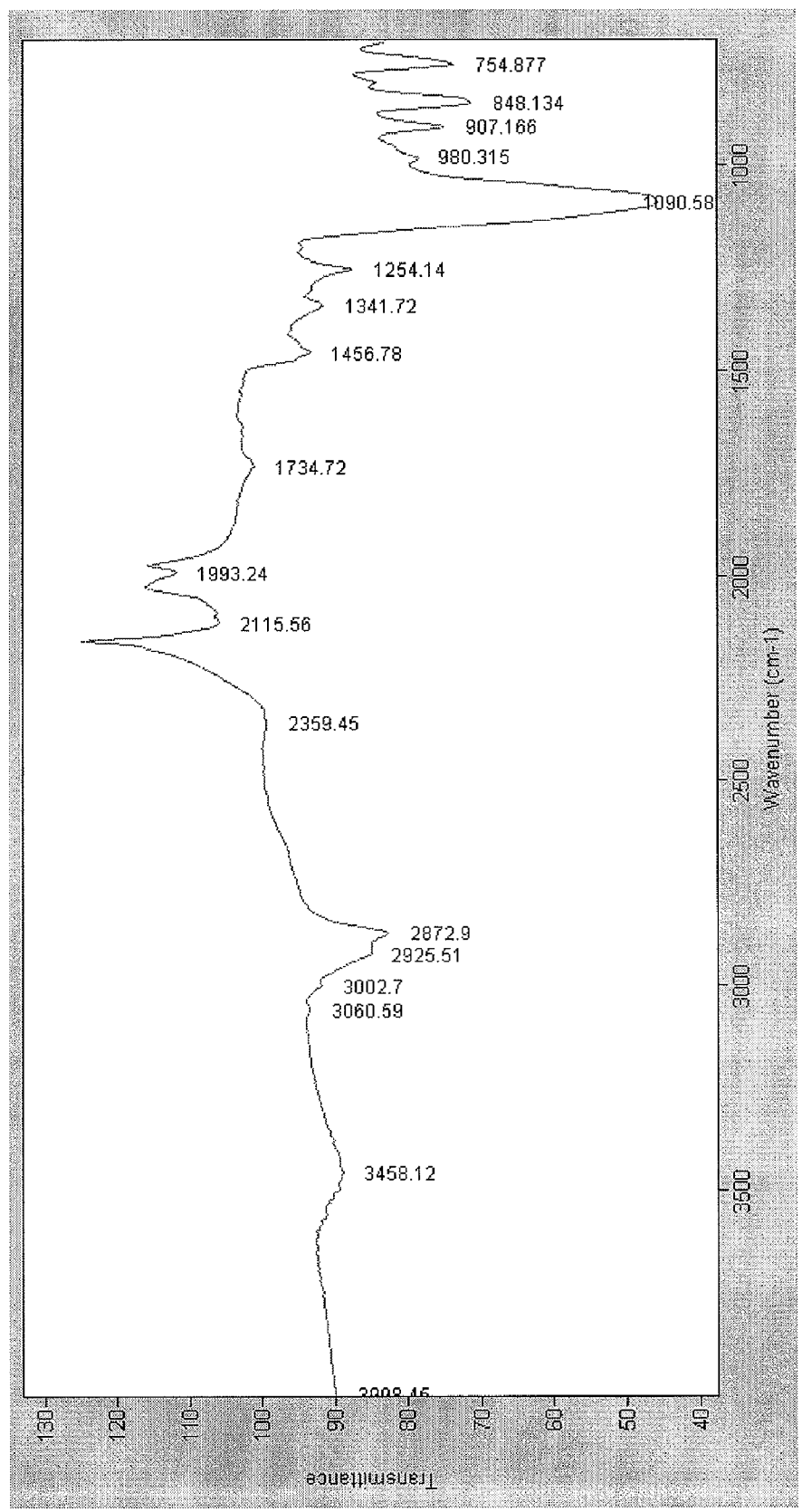
FIG. 4 is a drawing representing the FT-IR spectrum of the organic polysiloxane according to Preparing Example 2.

103.2 mL (0.5 mol) of 3-(2-aminoethylamino)propyl-dimethoxymethyl silane and 92.52 mL (1.0 mol) of epichlorohydrin were introduced together into a round 1 L 3-neck flask and then the solution was stirred with a stirrer at room temperature. The reaction was terminated after stirring for 3 hours, and 400 mL of distilled water and 37.2 mL (0.25 mol) of dimethyldiethoxy silane were introduced together therein, and then the solution was stirred again with a stirrer at room temperature. The reaction was terminated after stirring for 5 hours, and sodium hydroxide was introduced therein in order to eliminate the remaining HCl and then the organic polysiloxane was extracted by mixing ether therein. After distilling off the ether, 133 g of the light yellowish material obtained therefrom was analyzed by a FT-IR spectrometer and a NMR spectrometer, and the NMR spectrum and the FT-IR spectrum are illustrated in FIG. 3 and FIG. 4.

Example 1

12.5 g of the organic polysiloxane obtained from Preparing Example 1 was introduced into 975.5 g of pure water and then the solution was stirred at room temperature. After introducing 12 g of a diisocyanate blocked with caprolactam therein and preparing an adhesive composition, the twisted polyethyleneterephthalate (PET) fiber (1500d/384f) was dipped into the prepared adhesive composition. At this time, the tensile strength of the fiber was maintained to be 1.37 g/denier, and the speed of the dipped fiber passing through the adhesive composition was maintained to be 60 to 60 m/min. The fiber passed through the adhesive composition was dried and heat-treated, and then it was further dipped into a 20% RFL adhesive solution (second treating solution), dried at the temperature of 150° C., and stabilized at the temperature of 235° C. so as to prepare the dipped cord for reinforcing a tire.

Example 2

An adhesive composition was prepared by introducing 12 g of a diisocyanate blocked with a caprolactam and 12.5 g of the organic polysiloxane obtained from Preparing Example 1 were introduced into 975.5 g of a 20% RFL solution and stirring the same at room temperature for 30 min. The twisted polyethyleneterephthalate (PET) fiber (1500d/384f) was dipped into the prepared adhesive composition, and at this time, the tensile strength of the fiber was maintained to be 1.37 g/denier, and the speed of the dipped fiber passing through the adhesive composition was maintained to be 60 to 60 m/min. The fiber passed through the adhesive composition was dried at the temperature of 150° C., and stabilized at the temperature of 235° C. so as to prepare the dipped cord for reinforcing a tire.

Example 3

The dipped cord for reinforcing a tire was prepared substantially according to the same method as in Example 1, except that a polyamide fiber (1500d/384f) was used.

Comparative Example 1

The dipped cord for reinforcing a tire was prepared substantially according to the same method as in Example 1, except that an alkyl epoxy adhesive composition was used,

Comparative Example 2

The dipped cord for reinforcing a tire was prepared substantially according to the same method as in Example 1, except that an alkyl epoxy adhesive composition was used as the first adhesive composition and an adhesive composition including 22.5% RFL was used as the second adhesive composition.

The adhesive strength and the stiffness of the dipped cords of Examples 1 to 3 and Comparative Examples 1 and 2 were measured.

In view of the results of the measurements, the cords of Examples 1 to 3 have low stiffness and good flexibility in comparison with the cords of Comparative Examples 1 and 2, as listed in the following Table 1.

TABLE 1

| Samples | Adhesive strength (kgf, H-test) | Stiffness (g/3ea) |
|---|---|---|
| Example 1 | 13.5 | 14.0 |
| Example 2 | 14.5 | 16.1 |
| Example 3 | 12.2 | 18.3 |
| Comparative Example 1 | 13.4 | 27.1 |
| Comparative Example 2 | 14.0 | 29.0 |

Although the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An adhesive composition comprising an organic polysiloxane and a resorcinol-formaldehyde-latex resin, said organic polysiloxane including a repeating unit represented by the following Chemical Formula 1,
   wherein the weight ratio of the organic polysiloxane and the resorcinol-formaldehyde-latex resin is 1:15 to 1:2:

[Chemical Formula 1]

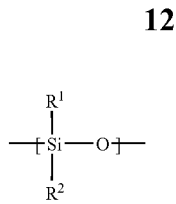

wherein,
   $R^1$ is a functional group having an epoxy end group, and
   $R^2$ is one selected from the group consisting a functional group having an epoxy end group, hydrogen, hydroxy, a C1-C6 alkyl, a C3-C8 cycloalkyl, a C6-C10 aryl, and a siloxane.

2. The adhesive composition according to claim 1, which further comprises an aqueous solvent, and wherein the organic polysiloxane is contained in an amount of 1 to 10 parts by weight per 100 parts by weight of the aqueous solvent.

3. The adhesive composition according to claim 1, further comprising a blocked isocyanate-based compound.

4. The adhesive composition according to claim 3, wherein the weight ratio of the organic polysiloxane and the blocked isocyanate-based compound is 1.0:0.5 to 1.0:3.5.

5. The adhesive composition according to claim 1, further comprising an aqueous solvent, and wherein the amount of the organic polysiloxane is 1 to 10 parts by weight and the amount of the resorcinol-formaldehyde-latex resin is 10 to 30 parts by weight per 100 parts by weight of the aqueous solvent.

6. The adhesive composition according to claim 1, which is used for surface-treating a fiber, a film, or a rubber reinforcing material.

7. The adhesive composition according to claim 6, wherein the fiber, the film, or the rubber reinforcing material includes one or more polymer selected from the group consisting of a polyester, a polyamide, or a cellulose-based polymer.

8. A rubber reinforcing material of which surface is treated with the adhesive composition of claim 1.

9. The reinforcing material according to claim 8, which is a tire cord.

10. The reinforcing material according to claim 9, wherein the tire cord includes one or more polymer selected from the group consisting of a polyester, a polyamide, and a cellulose-based polymer.

11. The reinforcing material according to claim 9, wherein the stiffness of the surface-treated tire cord is 9.0 to 20.0 g/3ea, determined on the tire cord of 1500 denier).

* * * * *